(12) United States Patent
Naruse et al.

(10) Patent No.: US 12,214,625 B2
(45) Date of Patent: Feb. 4, 2025

(54) WEAR-CONDITION-SENSING DEVICE

(71) Applicant: The Yokohama Rubber Co., LTD., Tokyo (JP)

(72) Inventors: Masahiro Naruse, Kanagawa (JP); Jun Matsuda, Kanagawa (JP); Heishiro Fudo, Tokyo (JP); Eiji Shinohara, Tokyo (JP); Shinya Ichise, Tokyo (JP); Hiroyuki Tobari, Tokyo (JP); Yuki Ono, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 206 days.

(21) Appl. No.: 17/759,321

(22) PCT Filed: Jan. 15, 2021

(86) PCT No.: PCT/JP2021/001295
§ 371 (c)(1),
(2) Date: Jul. 22, 2022

(87) PCT Pub. No.: WO2021/153277
PCT Pub. Date: Aug. 5, 2021

(65) Prior Publication Data
US 2023/0108225 A1      Apr. 6, 2023

(30) Foreign Application Priority Data

Jan. 29, 2020   (JP) ................. 2020-012332

(51) Int. Cl.
*B60C 11/00*      (2006.01)
*B60C 11/24*      (2006.01)

(52) U.S. Cl.
CPC .......... *B60C 11/243* (2013.01); *B60C 11/246* (2013.01)

(58) Field of Classification Search
CPC ............................ B60C 11/243; B60C 11/246
See application file for complete search history.

(56) References Cited

U.S. PATENT DOCUMENTS

| 2012/0011926 A1* | 1/2012 | Bigot .................... B60C 11/243 73/146 |
| 2013/0305818 A1 | 11/2013 | Hartmann et al. |
| 2015/0247780 A1* | 9/2015 | Kretschmann ...... B60C 23/0411 73/146.5 |

(Continued)

FOREIGN PATENT DOCUMENTS

| JP | 2003-526560 A | 9/2003 |
| JP | 2006-193119 A | 7/2006 |

(Continued)

*Primary Examiner* — Jamel E Williams
(74) *Attorney, Agent, or Firm* — Thorpe North & Western (57) ABSTRACT

A wear-condition-sensing device includes an element configured to generate voltage based on deformation of a tread portion during tire rotation, a voltage detection unit configured to detect the voltage generated by the element, a storage area configured to store waveform data over time of the voltage detected by the voltage detection unit, a calculation unit configured to calculate an index value of voltage change based on the waveform data stored in the storage area, and a determination unit configured to determine a progress condition of wear of the tread portion by comparing the index value calculated by the calculation unit with reference information.

16 Claims, 10 Drawing Sheets

(56) References Cited

U.S. PATENT DOCUMENTS

2016/0318356 A1 11/2016 McMillen
2020/0023693 A1* 1/2020 Ochi .................... B60C 23/135

FOREIGN PATENT DOCUMENTS

| | | | |
|---|---|---|---|
| JP | 2007-153034 | A | 6/2007 |
| JP | 2007-331292 | A | 12/2007 |
| JP | 2009-018667 | A | 1/2009 |
| JP | 2009-298327 | A | 12/2009 |
| JP | 2011-189795 | A | 9/2011 |
| JP | 2012-516258 | A | 7/2012 |
| JP | 2013-209064 | A | 10/2013 |
| JP | 2014-178271 | A | 9/2014 |
| JP | 2015-116689 | A | 6/2015 |
| JP | 2017-43343 | A | 3/2017 |
| KR | 10-2014-0067431 | A | 6/2014 |
| WO | 2009/008502 | A1 | 1/2009 |
| WO | 2020/250517 | A1 | 12/2020 |

* cited by examiner

WEAR-CONDITION-SENSING DEVICE

TECHNICAL FIELD

The present technology relates to a wear-condition-sensing device, and more particularly to a wear-condition-sensing device capable of accurately sensing a progress condition of wear in a tread portion of a pneumatic tire.

BACKGROUND ART

A wear condition of a pneumatic tire has been evaluated based on a measurement result of an acceleration measured with an acceleration sensor installed in the tire (see Japan Unexamined Patent Publication No. 2009-18667, for example). However, since a measurement result based on such an acceleration sensor includes many noises (disturbance in electric signals and the like), there is a problem in that additional works such as correction and masking of measurement data are increased for accurately evaluating a wear condition of a tire, and thus an evaluation method becomes complicated.

SUMMARY

The present technology provides a wear-condition-sensing device capable of accurately sensing a progress condition of wear in a tread portion of a pneumatic tire.

A wear-condition-sensing device according to the present technology includes an element configured to generate voltage based on deformation of a tread portion during tire rotation, a voltage detection unit configured to detect the voltage generated by the element, a storage area configured to store waveform data over time of the voltage detected by the voltage detection unit, a calculation unit configured to calculate an index value of voltage change based on the waveform data stored in the storage area, and a determination unit configured to determine a progress condition of wear of the tread portion by comparing the index value calculated by the calculation unit with reference information.

The present inventor has found that the voltage generated by the element based on the deformation of the tread portion during tire rotation includes less noise and can be measured and analyzed, and that such voltage can be an effective index for determining the wear condition of the tread portion, and consequently has made the present technology.

That is, in the present technology, since the element configured to generate voltage based on deformation of the tread portion during tire rotation, the voltage detection unit configured to detect the voltage generated by the element, the storage area configured to store waveform data over time of the voltage detected by the voltage detection unit, the calculation unit configured to calculate an index value of voltage change based on the waveform data stored in the storage area, and the determination unit configured to determine a progress condition of wear of the tread portion by comparing the index value calculated by the calculation unit with reference information are provided, the progress condition of wear in the tread portion can be accurately sensed.

In the wear-condition-sensing device according to the present technology, preferably, a speed detection unit configured to detect vehicle speed or tire rotation speed is included, the storage area stores the waveform data over time of the voltage detected by the voltage detection unit together with the vehicle speed or the tire rotation speed detected by the speed detection unit, the calculation unit calculates an index value of voltage change based on waveform data in a predetermined speed range stored in the storage area, the determination unit determines a progress condition of wear of the tread portion by comparing the index value calculated by the calculation unit with reference information corresponding to the predetermined speed range. Accordingly, the accuracy of determining the progress condition of the wear in the tread portion can be improved.

Preferably, an air pressure detection unit configured to detect air pressure inside a tire is included, and the calculation unit corrects waveform data or an index value obtained based on the waveform data on the basis of the air pressure detected by the air pressure detection unit. Accordingly, the accuracy of determining the progress condition of the wear in the tread portion 30) can be improved.

The calculation unit preferably calculates a peak amplitude value between the maximum value and the minimum value in waveform data as an index value of voltage change. Accordingly, the accuracy of determining the progress condition of the wear in the tread portion can be improved.

The determination unit preferably performs at least two determination operations, and conclusively determines the progress condition of the wear of the tread portion based on the results of these determination operations. Accordingly, the occurrence of an unexpected error in conclusive determination results can be reduced, and the accuracy of determining the progress condition of the wear in the tread portion can be improved.

Preferably, a sensor module including at least the element and the voltage detection unit is fixed to a tire inner surface via a container into which the sensor module is inserted.

Preferably, the container is bonded to the tire inner surface via an adhesive layer, and as roughness of the tire inner surface, an arithmetic mean height Sa ranges from 0.3 μm to 15.0 μm, and a maximum height Sz ranges from 2.5 μm to 60.0 μm. Accordingly, an adhesion area of the tire inner surface and the adhesive layer can be increased, and the adhesiveness between the tire inner surface and the container can be effectively improved. The roughness of the tire inner surface is measured in accordance with ISO25178. The arithmetic mean height Sa is an average of absolute values of a difference in height at respective points to an average surface of the surface, and the maximum height Sz is a distance in a height direction from the highest point to the lowest point on the surface.

A width Lc1 of an opening portion of the container and an inner width Lc2 of a bottom surface of the container preferably satisfy a relationship of Lc1<Lc2. Accordingly, since the width Lc1 of the opening portion is relatively small, it is possible to prevent the sensor module housed in the container from falling off, and it is possible to provide both workability for inserting the sensor module and a holding property of the container in a compatible manner.

The width Lc1 of the opening portion of the container and a maximum width Lsm of the sensor module preferably satisfy a relationship of 0.10≤Lc1/Lsm≤0.95. By appropriately setting a ratio of the width Lc1 of the opening portion to the maximum width Lsm of the sensor module in this manner, it is possible to effectively prevent the sensor module from falling off, and it is possible to improve the workability for inserting the sensor module and the holding property of the container.

The width Lc1 of the opening portion of the container, the inner width Lc2 of the bottom surface of the container, a width Ls1 of a top surface of the sensor module, and a width Ls2 of a lower surface of the sensor module preferably satisfy a relationship of Lc1<Ls1<Ls2≤Lc2. By appropriately setting the widths of the container and the sensor module in this manner, it is possible to effectively prevent the sensor module from falling off.

An average thickness of the container preferably ranges from 0.5 mm to 5.0 mm. Accordingly, it is possible to improve the workability for inserting the sensor module, the holding property of the container, and the breaking resistance of the container in a well-balanced manner.

A ratio of a height Hc of the container with the sensor module inserted to a height Hs of the sensor module preferably ranges from 0.5 to 1.5. This can effectively prevent the sensor module from falling off.

An elongation at break EB of rubber constituting the container preferably ranges from 50% to 900%, and a modulus at 300% elongation of the rubber constituting the container preferably ranges from 2 MPa to 15 MPa. Accordingly, it is possible to improve the workability for inserting the sensor module, the holding property of the container, and the breaking resistance of the container in a well-balanced manner. The elongation at break and the modulus at 300% elongation of the rubber constituting the container were measured in accordance with JIS (Japanese Industrial Standard)-K6251.

The container is preferably disposed on an inner side of a ground contact edge in a tire width direction. Accordingly, the sensor module inserted into the container can accurately acquire tire information.

The element is preferably a piezoelectric element. A piezoelectric element has a structure to generate voltage based on deformation of the tread portion during tire rotation, and thus is less likely to be affected by noise than an acceleration sensor or the like, and is capable of performing an accurate sensing.

In an embodiment of the present technology, "ground contact edge" refers to an end portion in the tire axial direction of a tire mounted on a regular rim and inflated to a regular internal pressure, and placed vertically on a flat surface with a regular load applied to the tire. "Regular rim" refers to a rim defined by a standard for each tire according to a system of standards that includes standards with which tires comply, and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. In a system of standards including standards with which tires comply, "regular internal pressure" refers to air pressure defined by each of the standards for each tire and is "maximum air pressure" defined by JATMA, a maximum value described in the table "TIRE LOAD LIMITS AT VARIOUS COLD INFLATION PRESSURES" defined by TRA, or "INFLATION PRESSURE" defined by ETRTO. However, "regular internal pressure" is 250) kPa in a case where a tire is a tire for a passenger vehicle. "Regular load" is a load defined by a standard for each tire according to a system of standards that includes standards with which tires comply, and is a "maximum load capacity" defined by JATMA, a maximum value described in the table "TIRE LOAD LIMITS AT VARIOUS COLD INFLATION PRESSURES" defined by TRA, or "LOAD CAPACITY" defined by ETRTO. However, "regular load" is a load corresponding to 80% of the load described above in a case where a tire is a tire for a passenger vehicle.

DETAILED DESCRIPTION

Figure 1:
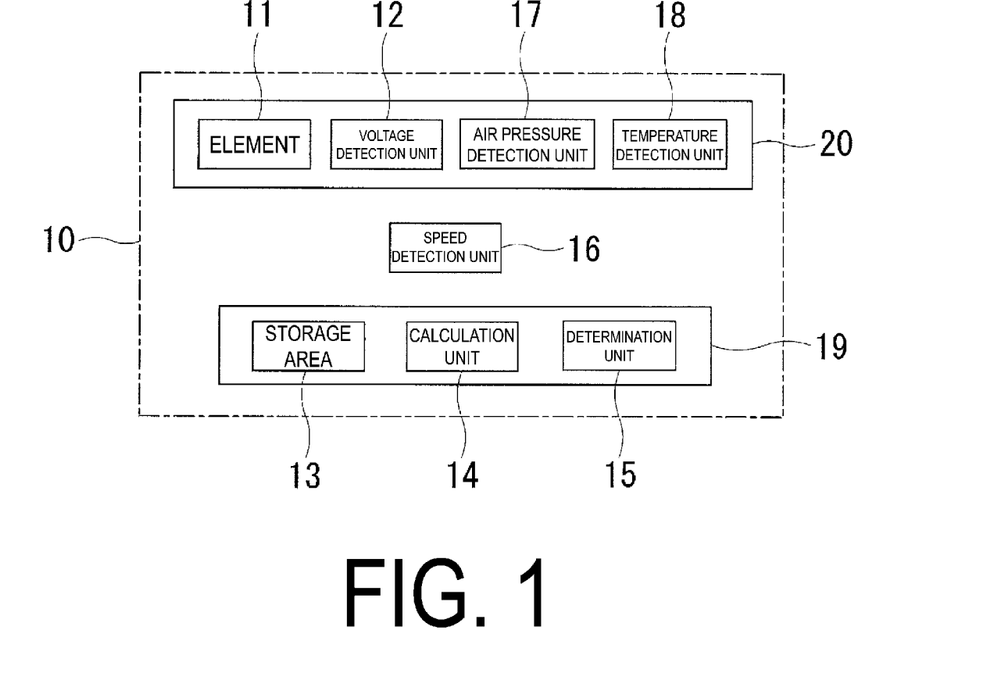
FIG. 1 is an explanatory diagram illustrating an example of a wear-condition-sensing device according to an embodiment of the present technology.

Configurations according to embodiments of the present technology will be described in detail below with reference to the accompanying drawings. FIG. 1 illustrates a wear-condition-sensing device according to an embodiment of the present technology.

In order to sense a progress condition of wear in a tread portion 1 of a tire T (see FIG. 6, for example), a wear-condition-sensing device 10 detects voltage based on deformation of a tread portion 1 during tire rotation and calculates an index value of voltage change based on waveform data over time of the detected voltage. The wear-condition-sensing device 10 determines the progress condition of the wear in the tread portion 1 of the tire T by comparing the calculated index value with reference information. This makes it possible to sense the progress condition of the wear in the tread portion 1 of the tire T which is a sensing target.

As illustrated in FIG. 1, the wear-condition-sensing device 10 includes an element 11 configured to generate voltage based on deformation of the tread portion 1 during tire rotation, a voltage detection unit 12 configured to detect the voltage generated by the element 11, and a storage area 13 configured to store waveform data over time of the voltage detected by the voltage detection unit 12, a calculation unit 14 configured to calculate an index value of voltage change based on the waveform data stored in the storage area 13, and a determination unit 15 configured to determine a progress condition of wear of the tread portion 1 by comparing the index value calculated by the calculation unit 14 with reference information.

The wear-condition-sensing device 10 may include a speed detection unit 16 configured to detect vehicle speed or tire rotation speed, an air pressure detection unit 17 configured to detect air pressure inside a tire, or a temperature detection unit 18 configured to detect temperature inside the tire, in addition to the voltage detection unit 12. Further, devices such as an input device, an output device, and a display may be appropriately added to the wear-condition-sensing device 10.

In the wear-condition-sensing device 10, the storage area 13, the calculation unit 14, and the determination unit 15 function as a data processing device 19. The data processing device 19 processes data input from a detection unit represented by the voltage detection unit 12. Data input to the data processing device 19 may be performed either by wire or wirelessly.

Further, in the wear-condition-sensing device 10, a sensor module 20 configured to acquire tire information can be used as a module including at least the element 11 and the voltage detection unit 12. The sensor module 20 can be mounted with sensors so as to include the air pressure detection unit 17 and the temperature detection unit 18, as appropriate, together with the element 11 and the voltage detection unit 12.

The element 11 is a component of the voltage detection unit 12, and is included in the voltage detection unit 12. The element 11 is not particularly limited as long as the element 11 generates voltage in proportion to the amount of deformation (deformation energy) of the tread portion 1 during tire rotation. As such an element 11, for example, a piezoelectric element can be used. The piezoelectric element is disposed so as to be directly or indirectly in contact with a tire inner surface, and is configured to be capable of sensing deformation of the tread portion 1. The element being indirectly in contact with the tire inner surface means that deformation of the tread portion 1 can be sensed even when another member intervenes between the element and the tire inner surface, such as in the case where the element is in contact with the tire inner surface via a housing of the sensor module 20 or where the element is covered with a protective layer made of rubber or the like and is in contact with the tire inner surface via the protective layer. The piezoelectric element has a structure to generate voltage based on deformation of the tread portion 1 during tire rotation as described above, and thus is less likely to be affected by noise and capable of performing an accurate sensing.

The voltage detection unit 12 is a voltage sensor configured to detect potential difference in the element 11 that is electrically charged. The voltage detection unit 12 includes the element 11 that generates voltage based on deformation of the tread portion 1 during tire rotation, and thus is different from a strain sensor that detects strain. The speed detection unit 16 may detect measurement data (vehicle speed) by a speed meter on a vehicle side, or may detect a tire rotation speed by using a sensor capable of detecting the tire rotation speed. Further, a pressure sensor may be used as the air pressure detection unit 17, and a temperature sensor may be used as the temperature detection unit 18.

Figure 2:
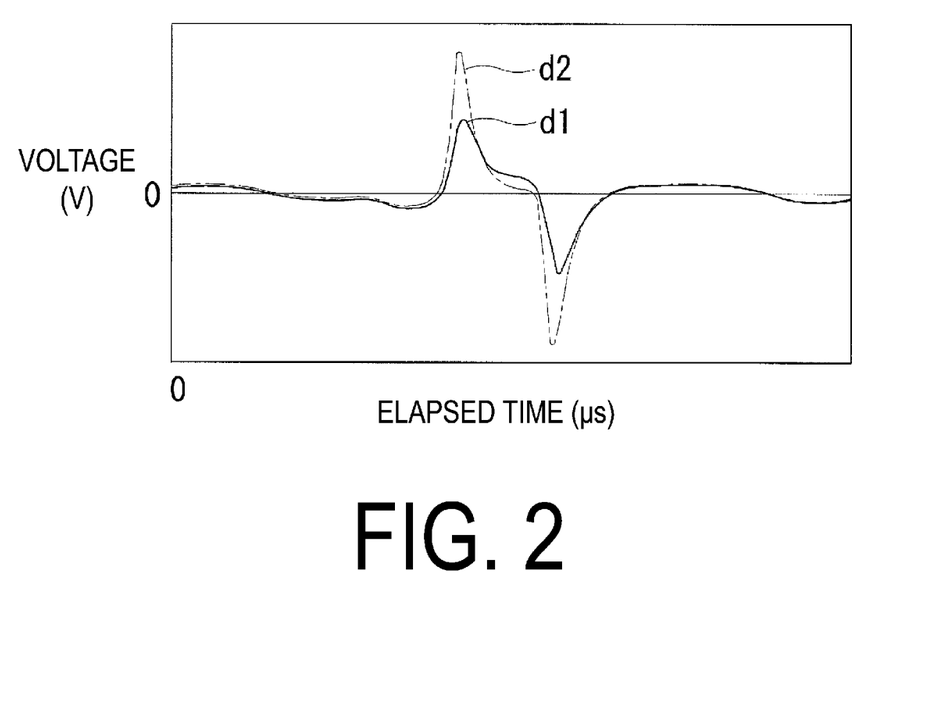
FIG. 2 is a graph showing an example of waveform data stored in a storage area of a wear-condition-sensing device according to an embodiment of the present technology.

The storage area 13 stores the waveform data over time of the voltage detected by the voltage detection unit 12. Here, the storage area 13 can be composed of an external storage device such as a hard disk or an internal storage device such as a RAM (random access memory), or a combination thereof. FIG. 2 illustrates waveform data stored in the storage area 13. In FIG. 2, the vertical axis represents voltage (V), the horizontal axis represents elapsed time (μs), and waveform data corresponding to one rotation of the tire T is illustrated. During one rotation of the tire T, the waveform (voltage) reaches a peak (a maximum value or a minimum value) when a point on the circumference of the tire T comes to a ground contact leading edge and to a ground contact trailing edge. Waveform data d1 is data of when the tire T is in new condition, and waveform data d2 is data of when the wear of the tread portion 1 of the tire T has progressed (late stage of wear). That is, as the wear of the tread portion 1 of the tire T progresses, the peak values of the voltage at the positions of the ground contact leading edge and the ground contact trailing edge tend to increase. Note that the waveform data illustrated in FIG. 2 is a typical example, and is not limited thereto.

In addition, in a case where the wear-condition-sensing device 10 includes the speed detection unit 16, the storage area 13 stores the waveform data of the voltage detected by the voltage detection unit 12 together with the vehicle speed or the tire rotation speed detected by the speed detection unit 16. That is, the vehicle speed or the tire rotation speed and the waveform data of the voltage are linked to each other and integrally stored in the storage area 13. Further, in a case where the wear-condition-sensing device 10 includes the air pressure detection unit 17 and the temperature detection unit 18, the storage area 13 stores the waveform data of the voltage detected by the voltage detection unit 12 together with the air pressure and the temperature respectively detected by the air pressure detection unit 17 and the temperature detection unit 18. That is, the air pressure and the temperature and the waveform data of the voltage are linked to each other and integrally stored in the storage area 13.

The calculation unit 14 calculates an index value of voltage change based on the waveform data stored in the storage area 13. At that time, the calculation unit 14 can store the calculated index value in the storage area 13, and can read out the stored index value and perform calculation. Here, as an index value of voltage change, a peak amplitude value between the maximum value and the minimum value in the waveform data or an area of the waveform data can be used. In addition, the calculation unit 14 can also read out two index values of voltage changes from the storage area 13 and calculate a change rate of one index value of the voltage change with respect to the other index value of the voltage change. The calculation unit 14 can be composed of, for example, a memory or a CPU (central processing unit).

Further, in a case where the wear-condition-sensing device 10 includes the speed detection unit 16, the calculation unit 14 calculates an index value of voltage change based on waveform data in a predetermined speed range stored in the storage area 13. Here, the predetermined speed range is a speed range in which a lower limit is −5 km/h with respect to an arbitrary speed [km/h] and an upper limit is +5 km/h with respect to the arbitrary speed. The arbitrary speed can be set, for example, within a range of 30 km/h to 60 km/h.

Furthermore, in a case where the wear-condition-sensing device 10 includes the air pressure detection unit 17 and the temperature detection unit 18, the calculation unit 14 can correct waveform data or an index value obtained based on the waveform data on the basis of the air pressure detected by the air pressure detection unit 17 and the temperature detected by the temperature detection unit 18. At that time, the calculation unit 14 reads out the waveform data or the index value stored in the storage area 13 and performs correction, and stores the corrected waveform data or the corrected index value in the storage area 13.

The determination unit 15 determines the progress condition of the wear of the tread portion 1 by comparing the index value of the voltage change calculated by the calculation unit 14 with reference information. At that time, the determination unit 15 reads out the index value of the voltage change from the storage area 13 and performs determination. The reference information compared with the index value of the voltage change is a criterion for determining that the tread portion 1 is worn. As the reference information, a ratio with respect to an index value of voltage change of when in new condition or a predetermined threshold value may be used. As a specific example, it is possible to set an arbitrary change rate (%) with respect to an index value of voltage change of when in new condition, or set a threshold value that has been examined in advance for a specific index value of voltage change. Note that determination results by the determination unit 15 can be indicated on a display provided on a vehicle, for example.

In a case where the wear-condition-sensing device 10 includes the speed detection unit 16, the determination unit 15 determines the progress condition of the wear of the tread portion 1 by comparing the index value calculated by the calculation unit 14 with reference information corresponding to the predetermined speed range.

Figure 3:
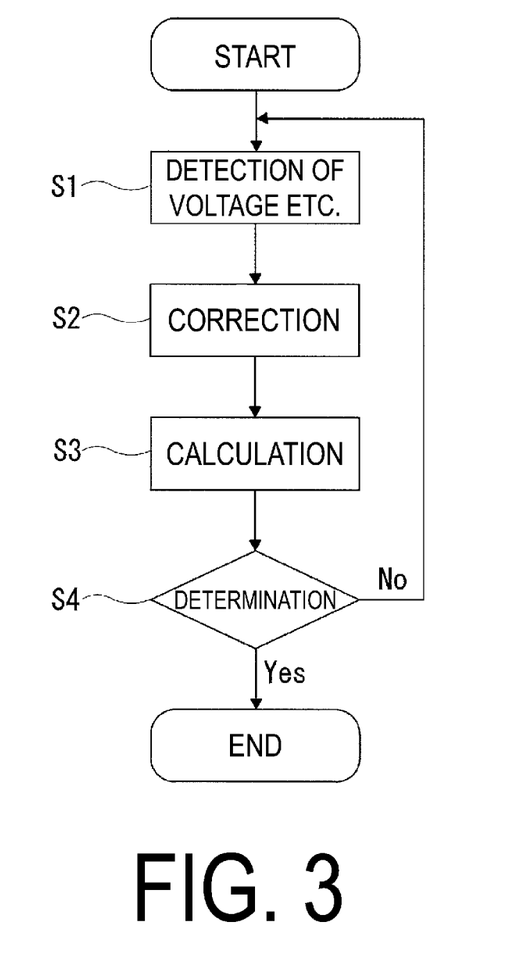
FIG. 3 is a flowchart illustrating an example of a procedure of a sensing method using a wear-condition-sensing device according to an embodiment of the present technology.

FIG. 3 illustrates a procedure of a sensing method using a wear-condition-sensing device according to an embodiment of the present technology. In detecting the progress condition of the wear in the tread portion 1 of the tire T, in step S1, the voltage detection unit 12 of the wear-condition-sensing device 10 detects voltage generated based on deformation of the tread portion 1 during the rotation of the tire T. At that time, the storage area 13 stores the waveform data over time of the voltage detected by the voltage detection unit 12.

Further, in step S1, the speed detection unit 16 detects vehicle speed or tire rotation speed, and the storage area 13 stores the waveform data of the voltage detected by the voltage detection unit 12 together with the vehicle speed or the tire rotation speed detected by the speed detection unit 16. In addition, the air pressure detection unit 17 and the temperature detection unit 18 detect air pressure and temperature, respectively, and the storage area 13 stores the waveform data of the voltage detected by the voltage detection unit 12 together with the air pressure and the temperature detected by the air pressure detection unit 17 and the temperature detection unit 18.

Next, the process proceeds to step S2, and the calculation unit 14 of the wear-condition-sensing device 10 corrects the waveform data of the voltage based on the air pressure and the temperature detected by the air pressure detection unit 17 and the temperature detection unit 18. When the air pressure detected by the air pressure detection unit 17 is relatively low, the amount of change in the entire tire tends to increase, and consequently the waveform data also tends to increase as a whole. Thus, the calculation unit 14 performs correction such that the waveform data of the voltage is reduced in a predetermined ratio. By performing the correction by the calculation unit 14 in this manner, it is possible to improve the accuracy of determining the progress condition of the wear in the tread portion 1. Then, the calculation unit 14 stores the corrected waveform data in the storage area 13. Note that air pressure inside a tire varies depending on temperature inside the tire, and thus the temperature detected by the temperature detection unit 18 is used for correction of the air pressure.

Figure 4A:
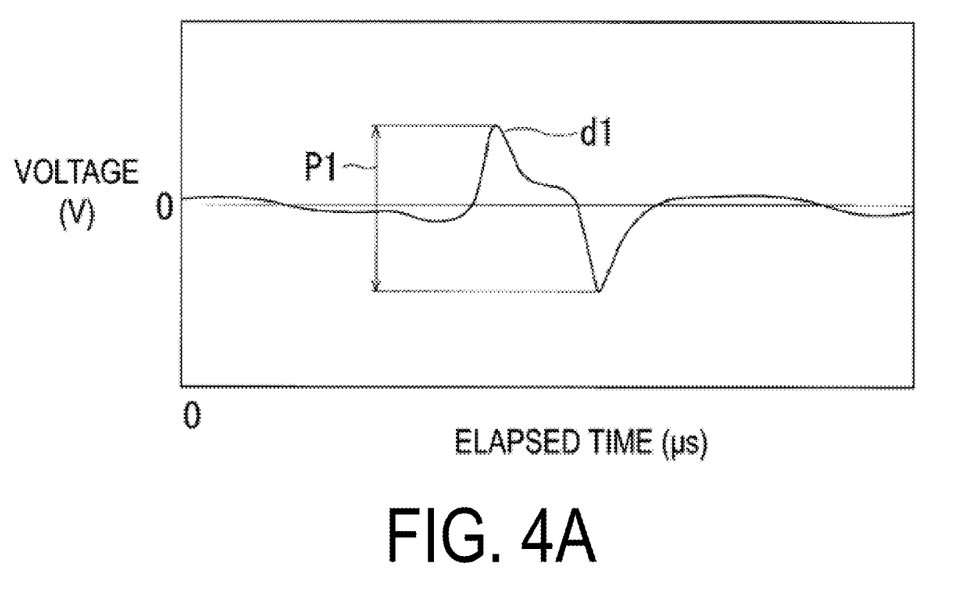
FIGS. 4A and 4B are explanatory diagrams of the waveform data of FIG. 2.
Figure 4B:
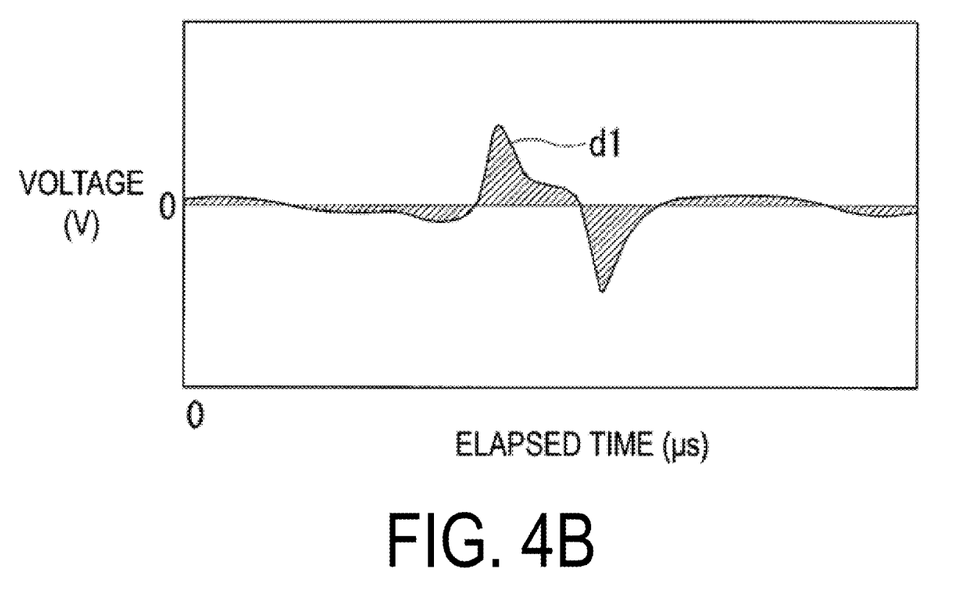

Next, the process proceeds to step S3, and the calculation unit 14 of the wear-condition-sensing device 10 calculates an index value of voltage change based on the waveform data in the predetermined speed range stored in the storage area 13. At that time, the calculation unit 14 may calculate a peak amplitude value between the maximum value and the minimum value in the waveform data (see FIG. 4A) or may calculate an area of the waveform data (see FIG. 4B), as the index value of voltage change. More specifically, the calculation unit 14 calculates a peak amplitude value P1 (V) of the waveform data d1 as illustrated in FIG. 4A, or calculates an area of the waveform data d1 (the area of the shaded region indicated) as illustrated in FIG. 4B. Then, the calculation unit 14 stores the calculated index value in the storage area 13. Note that the peak amplitude value P1 calculated by the calculation unit 14 indicates a value of the tire T in new condition.

Next, the process proceeds to step S4, and the determination unit 15 of the wear-condition-sensing device 10 determines the progress condition of the wear of the tread portion 1 by comparing the index value calculated by the calculation unit 14 with reference information. For example, in a case where an index value of voltage change is a peak amplitude value, reference information to be compared is a change rate with respect to the peak amplitude value of when in new condition, and the change rate is set to 150%, the determination unit 15 compares a change rate based on the peak amplitude value calculated by the calculation unit 14 with the predetermined change rate (150%) described above to determine the magnitude relationship between the change rates, and when the predetermined change rate is exceeded, the determination unit 15 concludes that a determination criterion is satisfied. The determination operation terminates when the determination criterion is satisfied as described above. On the other hand, when the determination criterion is not satisfied, the process returns to step S1.

In the embodiment of FIG. 3, an example in which the correction is performed by the calculation unit 14 in step S2 and the calculation is performed by the calculation unit 14 in step S3 has been described, but the order of the correction and the calculation is not particularly limited thereto, and can be changed. That is, the calculation may be performed by the calculation unit 14 in step S2, and the correction may be performed by the calculation unit 14 in step S3. In that case, the calculation unit 14 calculates an index value of voltage change based on the waveform data stored in the storage area 13 in step 2, and then corrects the index value obtained based on the waveform data (the calculated index value) in step 3.

Since the wear-condition-sensing device 10 includes the element 11 configured to generate voltage based on deformation of the tread portion 1 during tire rotation, the voltage detection unit 12 configured to detect the voltage generated by the element 11, the storage area 13 configured to store waveform data over time of the voltage detected by the voltage detection unit 12, the calculation unit 14 configured to calculate an index value of voltage change based on the waveform data stored in the storage area 13, and the determination unit 15 configured to determine a progress condition of wear of the tread portion 1 by comparing the index value calculated by the calculation unit 14 with reference information, the progress condition of the wear in the tread portion 1 can be accurately sensed.

Figure 5:
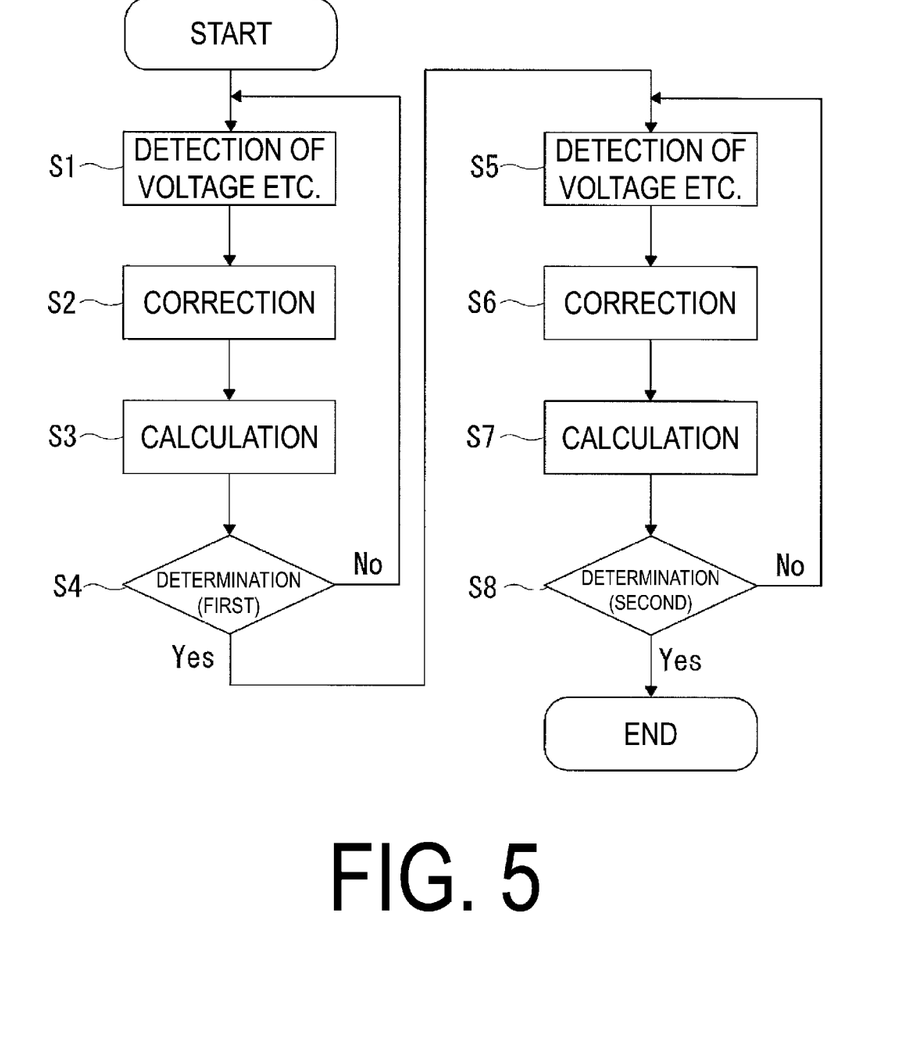
FIG. 5 is a flowchart illustrating a modified example of a procedure of a sensing method using a wear-condition-sensing device according to an embodiment of the present technology.

FIG. 5 illustrates a modified example of a procedure of a sensing method using a wear-condition-sensing device according to an embodiment of the present technology. In FIG. 5, the determination unit 15 of the wear-condition-sensing device 10 performs at least two determination operations, and conclusively determines the progress condition of the wear of the tread portion 1 based on the results of these determination operations. The procedure illustrated in FIG. 5 is identical to that illustrated in FIG. 3 up to step S4. Next, the process proceeds to step S5 from step S4, and the voltage detection unit 12 detects the voltage generated by the element 11. Next, the process proceeds to step S6, and the calculation unit 14 corrects the waveform data based on the air pressure and the temperature detected by the air pressure detection unit 17 and the temperature detection unit 18, respectively. Then, the calculation unit 14 stores the corrected waveform data in the storage area 13. Next, the process proceeds to step S7, and the calculation unit 14 calculates an index value of voltage change based on the waveform data in the predetermined speed range stored in the storage area 13. Then, the calculation unit 14 stores the calculated index value in the storage area 13. Next, the process proceeds to step S8, and the determination unit 15 performs the second determination operation. At that time, the determination operation terminates when an arbitrary determination criterion is satisfied. On the other hand, when the determination criterion is not satisfied, the process returns to step S5. As for the second determination operation by the determination unit 15, the first determination operation (steps S1 to S4) and the second determination operation (steps S5 to S8) may be performed on the same day, or the first determination operation and the second determination operation may be performed on different days.

By performing at least two determination operations by the determination unit 15 as described above, the occurrence of an unexpected error in conclusive determination results can be reduced, and the accuracy of determining the progress condition of the wear in the tread portion 1 can be improved.

In the embodiment of FIG. 5, an example in which the number of times of determination by the determination unit 15 is two has been described, but the number of times of determination is not particularly limited thereto, and may be set to any number of times equal to or greater than two times. Also, in the embodiment of FIG. 5, an example in which the process returns to step S5 when the determination criterion is not satisfied in step S8, but the process may be configured to return to step S1 when the determination criterion is not satisfied in step S8.

Figure 6:
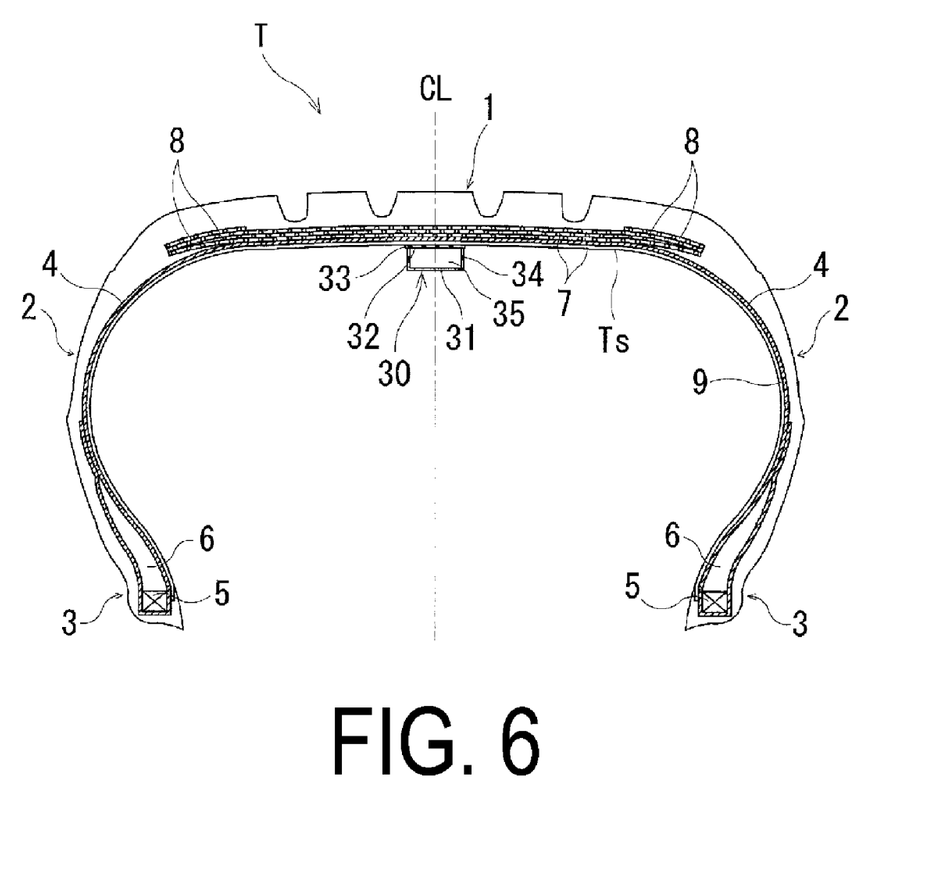
FIG. 6 is a meridian cross-sectional view illustrating a pneumatic tire for which a wear condition is determined by a wear-condition-sensing device according to an embodiment of the present technology.
Figure 7:
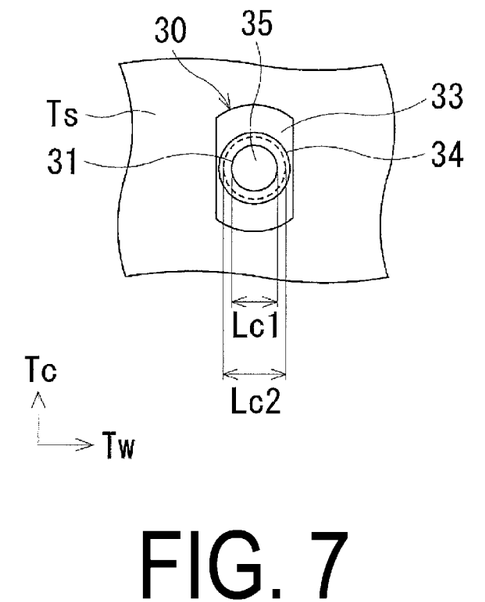
FIG. 7 is a plan view illustrating a container attached to the pneumatic tire of FIG. 6.
Figure 8:
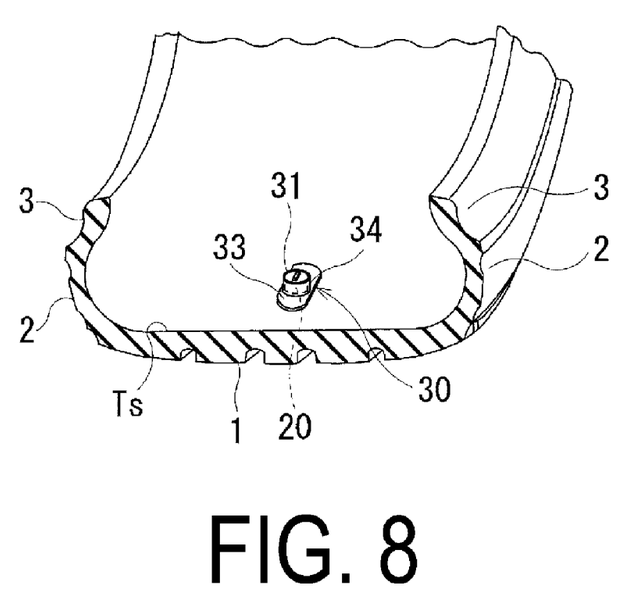
FIG. 8 is a perspective cross-sectional view illustrating a state in which a sensor module is inserted into the container of FIG. 6.
Figure 9:
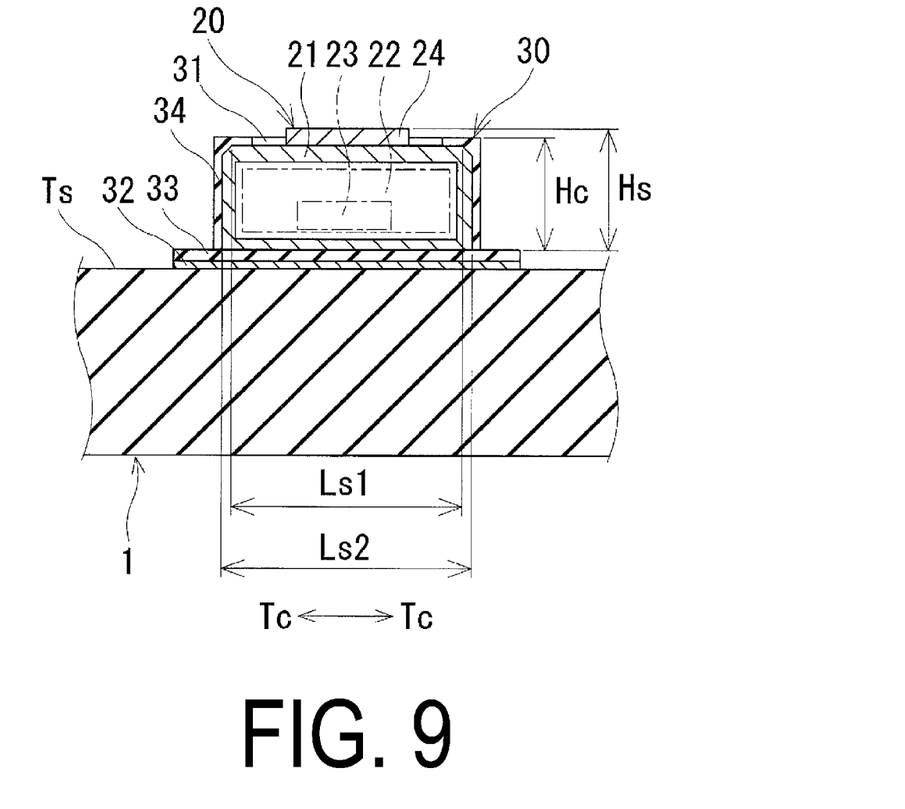
FIG. 9 is a cross-sectional view illustrating a state in which a sensor module is inserted into the container of FIG. 6.

FIG. 6 illustrates a pneumatic tire (tire T) that is a detection target of the wear-condition-sensing device 10 according to an embodiment of the present technology. FIGS. 7 to 9 illustrate the sensor module 20 or the container 30 mounted on the tire T. In FIGS. 7 and 9, an arrow Tc represents a tire circumferential direction, and an arrow Tw represents a tire width direction.

As illustrated in FIG. 6, the tire T includes the tread portion 1 extending in the tire circumferential direction and having an annular shape, a pair of sidewall portions 2, 2 disposed on both sides of the tread portion 1, and a pair of bead portions 3, 3 disposed on inner sides of the sidewall portions 2 in a tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5. Furthermore, an innerliner layer 9 is disposed in a region between the pair of bead portions 3, 3 on a tire inner surface Ts. The innerliner layer 9 forms the tire inner surface Ts.

On the other hand, a plurality of belt layers 7 are embedded on an outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the belt layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8, formed by disposing reinforcing cords at an angle of, for example, 5° or less with respect to the tire circumferential direction, is disposed on an outer circumferential side of the belt layers 7. Organic filament cords such as nylon and aramid are preferably used as the reinforcing cords of the belt cover layer 8.

Note that the tire internal structure described above represents a typical example for a pneumatic tire, but the pneumatic tire is not limited thereto.

At least one container 30 made of rubber is fixed in a region corresponding to the tread portion 1 of the tire inner surface Ts of the tire T. The sensor module 20 is inserted into the container 30. The container 30 includes an opening portion 31 into which the sensor module 20 is inserted, and is bonded to the tire inner surface Ts via an adhesive layer 32. Since the sensor module 20 is configured to be freely housed in the container 30, the sensor module 20 can be replaced as necessary at the time of replacement, failure, or the like. In addition, since the container 30 is made of rubber, the container 30 suitably expands and contracts when the sensor module 20 is inserted into and taken out of the opening portion 31.

Examples of the material of the container 30 include chloroprene rubber (CR), butyl rubber (IIR), natural rubber (NR), acrylonitrile-butadiene copolymer rubber (NBR), butadiene rubber (BR), styrene-butadiene rubber (SBR), or the like, and a single material or a blend of two or more materials can be used. Since these materials are excellent in adhesiveness to butyl rubber constituting the tire inner surface Ts, when the container 30 is formed of any of the above materials, sufficient adhesiveness between the container 30 and the tire inner surface Ts can be secured.

As illustrated in FIG. 9, the sensor module 20 includes a housing 21 and an electronic component 22. The housing 21 has a hollow structure, and accommodates the electronic component 22 inside. The electronic component 22 may be configured to include a transmitter, a receiver, a control circuit, a battery, and the like, as appropriate, together with a sensor 23 that acquires the above-described tire information such as voltage, speed, air pressure, and temperature of the tire T. As the sensor 23, for example, a speed sensor (the speed detection unit 16), a pressure sensor (the air pressure detection unit 17), or a temperature sensor (the temperature detection unit 18) can be used together with a piezoelectric sensor (the element 11 and the voltage detection unit 12). In particular, the piezoelectric sensor includes the element 11 that generates voltage based on deformation of the tread portion 1 during tire rotation. The piezoelectric sensor is different from a piezoelectric type acceleration sensor. An acceleration sensor or a magnetic sensor other than the sensors described above can also be used. In addition, the sensor module 20 is configured to be capable of transmitting the tire information acquired by the sensor 23 to the storage area 13. Further, in order to make it easy to hold the sensor module 20, a knob portion 24 protruding from the housing 21 may be provided, and the knob portion 24 can have a function of an antenna. Note that the internal structure of the sensor module 20 illustrated in FIG. 9 is an example of the sensor module, and the internal structure is not limited thereto.

The container 30 is bonded to the tire inner surface Ts via the adhesive layer 32. The container 30 includes a base portion 33 having a plate shape and joined to the tire inner surface Ts, a tube portion 34 having a cylindrical shape and protruding from the base portion 33, and a housing portion 35 formed in the tube portion 34. The housing portion 35 communicates with the opening portion 31 having a circular shape. Thus, the housing portion 35 has a substantially quadrangle cross-sectional shape with the base portion 33 as a bottom surface and the opening portion 31 as an upper surface. The sensor module 20 having a cylindrical shape with a tapered upper surface is housed in the housing portion 35. Note that the shapes of the base portion 33, the tube portion 34, and the housing portion 35 are not particularly limited, and can be appropriately changed according to the shape of the sensor module 20 to be inserted into the container 30.

The adhesive layer 32 is not particularly limited as long as it can bond the rubber composition. Examples thereof include an adhesive agent, an adhesive tape, a vulcanized adhesive that is naturally vulcanized (vulcanizable at normal temperature), and a puncture repair agent used as an emergency treatment when a pneumatic tire is punctured. In particular, a vulcanized adhesive is preferably used as the adhesive layer 32 because the vulcanized adhesive can make it unnecessary to perform a primer treatment needed for fixing the container using an adhesive tape and thus can improve productivity. Note that the primer treatment (base coat treatment) is preliminarily applied to the tire inner surface to improve adhesiveness.

The above-described pneumatic tire includes, on the tire inner surface Ts, at least one container 30 made of rubber and configured to be used for insertion of the sensor module 20. The container 30 includes the base portion 33 having a plate shape and joined to the tire inner surface Ts via the adhesive layer 32, the tube portion 34 protruding from the base portion 33, the housing portion 35 formed in the tube portion 34, and the opening portion 31 communicating with the housing portion 35. Accordingly, it is possible to easily perform an operation of inserting the sensor module 20 into the container 30, and securely hold the sensor module 20 by tightening of the container 30 so as to prevent the sensor module 20 from falling off.

Preferably, in the above-described pneumatic tire, the container 30 is bonded to the tire inner surface Ts via the adhesive layer 32, and as roughness of the tire inner surface Ts, an arithmetic mean height Sa ranges from 0.3 μm to 15.0 μm, and a maximum height Sz ranges from 2.5 μm to 60.0 μm. By appropriately setting the arithmetic mean height Sa and the maximum height Sz as the roughness of the tire inner surface Ts in this manner, the adhesion area between the tire inner surface Ts and the adhesive layer 32 can be increased, and the adhesiveness between the tire inner surface Ts and the container 30 can be improved effectively. When the arithmetic mean height Sa exceeds 15.0 μm and the maximum height Sz exceeds 60.0 μm, the adhesive layer 32 cannot follow the unevenness of the tire inner surface Ts, and the adhesiveness tends to decrease. Note that the arithmetic mean height Sa and the maximum height Sz are values measured in accordance with ISO25178, and can be measured using a commercially available surface properties measuring machine (e.g., a shape analysis laser microscope or a 3D shape measuring machine). The measurement method may be any of a contact type or a non-contact type.

In FIGS. 6 and 8, the container 30 is disposed on an inner side of the ground contact edge in the tire width direction. The sensor 23 in the sensor module 20 inserted into the container 30 can accurately acquire tire information.

In the above-described pneumatic tire, the container 30 may be set to have the following dimensions. A width Lc1 of the opening portion 31 of the container 30 and an inner width Lc2 of the bottom surface of the container 30 preferably satisfy a relationship of Lc1<Lc2. By making the width Lc1 of the opening portion 31 narrower than the inner width Lc2 of the bottom surface of the container 30 in this manner, a restricting force on the upper surface side of the container 30 is increased, and the sensor module 20 inserted into the container 30 can be effectively prevented from falling off. Accordingly, both workability for inserting the sensor module 20 and holding property of the container 30 can be provided in a compatible manner. Both the width Lc1 of the opening portion 31 and the inner width Lc2 of the bottom surface of the container 30 are measured in a state where the sensor module 20 is not inserted into the container 30.

Additionally, an average thickness of the container 30 preferably ranges from 0.5 mm to 5.0 mm. By appropriately setting the average thickness of the container 30 in this manner, it is possible to improve the workability for inserting the sensor module 20, the holding property of the container 30, and the breaking resistance of the container 30 in a well-balanced manner. Here, when the average thickness of the container 30 is thinner than 0.5 mm, the container 30 is easily broken when the sensor module 20 is inserted. When the average thickness of the container 30 is thicker than 5.0 mm, the rigidity of the container 30 becomes excessively large, and the sensor module 20 cannot be easily inserted. The average thickness of the container 30 is obtained by measuring the thickness of the rubber constituting the container 30.

In particular, the container 30 and the sensor module 20 preferably satisfy the following dimensional relationship. The width Lc1 of the opening portion 31 of the container 30 and a maximum width Lsm of the sensor module 20 to be inserted into the container 30 preferably satisfy a relationship of $0.10 \leq Lc1/Lsm \leq 0.95$, more preferably satisfy a relationship of $0.15 \leq Lc1/Lsm \leq 0.80$, and most preferably satisfy a relationship $0.15 \leq Lc1/Lsm \leq 0.65$. By appropriately setting the ratio of the width Lc1 of the opening portion 31 of the container 30 to the maximum width Lsm of the sensor module 20 in this manner, it is possible to effectively prevent the sensor module 20 from falling off, and it is possible to improve the workability for inserting the sensor module 20 and the holding property of the container 30. In the sensor module 20 illustrated in FIG. 9, the maximum width Lsm corresponds to a width Ls2 of the lower surface.

Further, the width Lc1 of the opening portion 31 of the container 30, the inner width Lc2 of the bottom surface of the container 30, a width Ls1 of the upper surface of the sensor module 20, and a width Ls2 of the lower surface of the sensor module 20 preferably satisfy a relationship of $Lc1 < Ls1 \leq Ls2 \leq Lc2$. Furthermore, the upper surface of the sensor module 20 is preferably formed in a tapered shape so as to satisfy a relationship of $Ls1 < Ls2$. By appropriately setting the widths of the container 30 and the sensor module 20 in this manner, it is possible to effectively prevent the sensor module 20 from falling off. Alternatively, in the sensor module 20, it is also possible to employ a form in which the diameter is gradually decreased from the upper surface thereof toward the lower surface. In that case, it is preferable to satisfy a relationship of $Ls2 < Ls1$, and $Ls2 \leq Lc2$, and $Lc1 < Ls1$.

Furthermore, the ratio of a height Hc of the container 30 with the sensor module 20 inserted to a height (maximum height) Hs of the sensor module 20 preferably ranges from 0.5 to 1.5, more preferably ranges from 0.6 to 1.3, and most preferably ranges from 0.7 to 1.0. By appropriately setting the ratio of the height Hc of the container 30 to the height Hs of the sensor module 20 in this manner, it is possible to effectively prevent the sensor module 20 from falling off. When the knob portion 24 is provided in the sensor module 20, the height Hs of the sensor module 20 is a height including the knob portion 24 (see FIG. 9). Also, the height Hc of the container 30 does not include the height of the base portion 33, and is a height of the cylindrical portion 34 (see FIG. 9).

In the above-described pneumatic tire, the rubber constituting the container 30 preferably has the following physical properties. The elongation at break EB preferably ranges from 50% to 900%, and the modulus at 300% elongation (M300) preferably ranges from 2 MPa to 15 MPa. By appropriately setting the elongation at break EB and the modulus (M300) in this manner, it is possible to improve the workability for inserting the sensor module 20, the holding property of the container 30, and the breaking resistance of the container 30 in a well-balanced manner.

EXAMPLE

Tires of Examples 1 to 6 having a tire size of 275/40R21 were manufactured. The tires include a wear-condition-sensing device having an element configured to generate voltage based on deformation of a tread portion during tire rotation, a voltage detection unit configured to detect the voltage generated by the element, a storage area configured to store waveform data over time of the voltage detected by the voltage detection unit, a calculation unit configured to calculate an index value of voltage change based on the waveform data stored in the storage area, and a determination unit configured to determine a progress condition of wear of the tread portion by comparing the index value calculated by the calculation unit with reference information. A sensor module including the element and the voltage detection unit is fixed to a tire inner surface via a container configured to house the sensor module. The container includes an opening portion into which the sensor module is inserted. The ratio of a width Lc1 of the opening portion to a maximum width Lsm of the sensor module (Lc1/Lsm) is set according to Table 1.

The test tires were evaluated for wear sensing performance, workability for inserting the sensor module, and durability by test methods described below, and the results are collectively indicated in Table 1.

Figure 10:
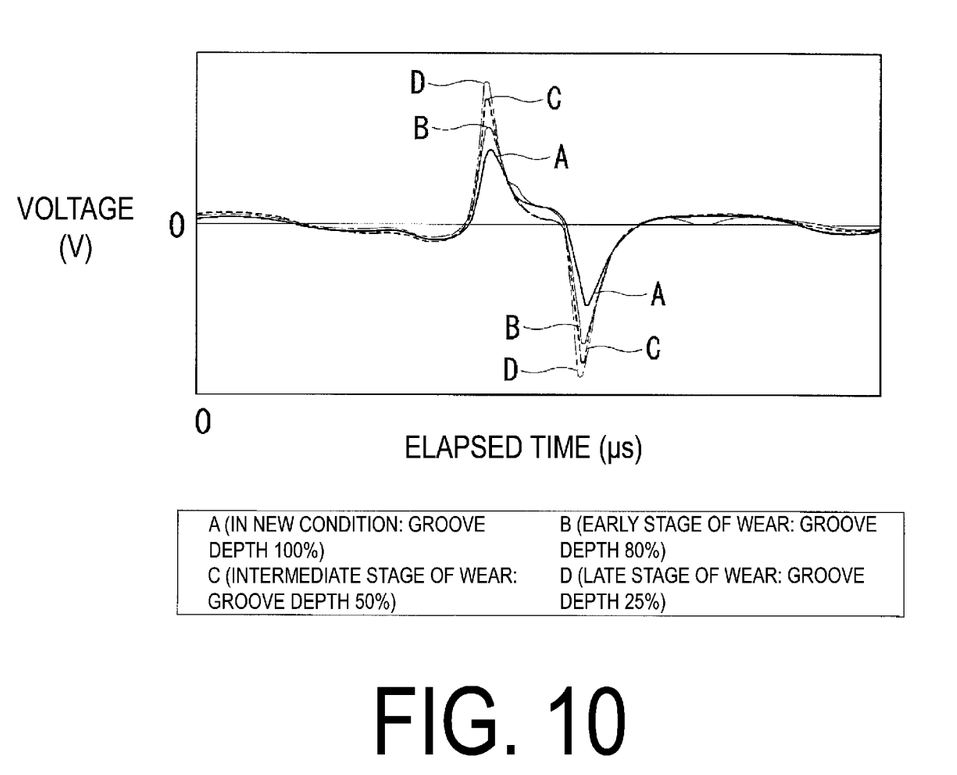
FIG. 10 is a graph showing waveform data at a plurality of points in time for a pneumatic tire according to Example 1.

Wear Sensing Performance:

For each test tire, the progress condition of the wear of the tread portion was determined by the wear-condition-sensing device. For example, in Example 1, the waveform data as illustrated in FIG. 10 was obtained. As illustrated, the peak amplitude value of the waveform data at each point in time gradually increased as wear of the tread portion progressed from a new condition A to a late stage of wear D (as a ratio of a groove depth at each point in time to a groove depth when in new condition decreased). That is, the peak amplitude value of the waveform data is useful as an index value of voltage change, and a correlation between the voltage and the groove depth was confirmed. Also for Examples 2 to 6, when there was a correlation between the voltage and the groove depth, "Good" is indicated in Table 1.

Workability for Inserting Sensor Module:

For each test tire, the time required for inserting the sensor module into the container provided on the tire inner surface was measured. The evaluation results are expressed as index values using the reciprocal of the measurement values, with Example 1 being assigned an index value of 100. The larger the index value is, the easier the insertion of the sensor module is.

Durability:

Each test tire was mounted on a wheel having a rim size of 21×9.5 J, and a running test was performed by using a drum testing machine under the conditions of an air pressure of 120 kPa, a load at 102% with respect to the maximum load, a running speed of 81 km/h, and a running distance of 10000 km. After the test was performed, presence of breakage of the container or falling off of the sensor module was visually confirmed. The evaluation results are expressed as the presence or absence of breakage of the container and the presence or absence of falling off of the sensor module.

TABLE 1

|  | Example 1 | Example 2 | Example 3 | Example 4 | Example 5 | Example 6 |
| --- | --- | --- | --- | --- | --- | --- |
| Ratio of width Lc1 of opening portion to maximum width Lsm of sensor module (Lc1/Lsm) | 0.09 | 0.10 | 0.50 | 0.90 | 0.90 | 0.95 |
| Wear sensing performance | Good | Good | Good | Good | Good | Good |
| Workability for inserting sensor module | 100 | 101 | 103 | 105 | 105 | 106 |
| Durability (presence or absence of breakage of container) | Presence | Absence | Absence | Absence | Absence | Absence |
| Durability (presence or absence of falling off of sensor module) | Absence | Absence | Absence | Absence | Absence | Presence |

As can be seen from Table 1, the wear-condition-sensing devices of Examples 1 to 6 had good wear sensing performance. Examples 2 to 6 had improved workability for inserting the sensor module as compared with Example 1. Examples 3 to 5 had no breakage of the container and no falling off of the sensor module.

The invention claimed is:

1. A wear-condition-sensing device comprising:
   an element configured to generate voltage based on deformation of a tread portion during tire rotation;
   a voltage detection unit configured to detect the voltage generated by the element;
   a speed detection unit configured to detect vehicle speed or tire rotation speed;
   a storage area configured to integrally store waveform data over time of the voltage detected by the voltage detection unit together with the vehicle speed or the rotation speed detected by the detection unit;
   a calculation unit configured to calculate an index value of voltage change based on the waveform data in a predetermined speed range stored in the storage area; and a determination unit configured to determine a progress condition of wear of the tread portion by comparing the index value calculated by the calculation unit with reference information corresponding to a predetermined speed range to determine a progress state of wear of the tread portion, the predetermined speed range being a range of ±5 km/h from any speed within a range of 30 km/h to 60 km/h.

2. The wear-condition-sensing device according to claim 1, comprising an air pressure detection unit configured to detect air pressure inside a tire, wherein the calculation unit corrects the waveform data or the index value obtained based on the waveform data on a basis of the air pressure detected by the air pressure detection unit.

3. The wear-condition-sensing device according to claim 1, wherein the calculation unit calculates a peak amplitude value between a maximum value and a minimum value in the waveform data as the index value of voltage change.

4. The wear-condition-sensing device according to claim 1, wherein the determination unit performs at least two determination operations, and conclusively determines the progress condition of the wear of the tread portion based on results of the determination operations.

5. The wear-condition-sensing device according to claim 1, wherein a sensor module comprising at least the element and the voltage detection unit is fixed to a tire inner surface via a container into which the sensor module is inserted.

6. The wear-condition-sensing device according to claim 5, wherein
the container is bonded to the tire inner surface via an adhesive layer, and
as roughness of the tire inner surface, an arithmetic mean height Sa ranges from 0.3 μm to 15.0 μm, and a maximum height Sz ranges from 2.5 μm to 60.0 μm.

7. The wear-condition-sensing device according to claim 5, wherein a width Lc1 of an opening portion of the container and an inner width Lc2 of a bottom surface of the container satisfy a relationship of Lc1<Lc2.

8. The wear-condition-sensing device according to claim 5, wherein a width Lc1 of an opening portion of the container and a maximum width Lsm of the sensor module satisfy a relationship of 0.10≤Lc1/Lsm≤0.95.

9. The wear-condition-sensing device according to claim 5, wherein a width Lc1 of an opening portion of the container, an inner width Lc2 of a bottom surface of the container, a width Ls1 of an upper surface of the sensor module, and a width Ls2 of a lower surface of the sensor module satisfy a relationship of Lc1<Ls1≤Ls2≤Lc2.

10. The wear-condition-sensing device according to claim 5, wherein an average thickness of the container ranges from 0.5 mm to 5.0 mm.

11. The wear-condition-sensing device according to claim 5, wherein a ratio of a height Hc of the container with the sensor module inserted to a height Hs of the sensor module ranges from 0.5 to 1.5.

12. The wear-condition-sensing device according to claim 5, wherein
an elongation at break EB of rubber constituting the container ranges from 50% to 900%, and
a modulus at 300% elongation of the rubber constituting the container ranges from 2 MPa to 15 MPa.

13. The wear-condition-sensing device according to claim 5, wherein the container is disposed on an inner side of a ground contact edge in a tire width direction.

14. The wear-condition-sensing device according to claim 1, wherein the element is a piezoelectric element.

15. The wear-condition-sensing device according to claim 1, wherein the reference information is an arbitrary rate of change with respect to the index value of voltage change when the tire was new.

16. A wear-condition-sensing device comprising:
an element configured to generate voltage based on deformation of a tread portion during tire rotation;
a voltage detection unit configured to detect the voltage generated by the element;
a speed detection unit configured to detect vehicle speed or tire rotation speed;
a storage area configured to integrally store waveform data over time of the voltage detected by the voltage detection unit together with the vehicle speed or the tire rotation speed detected by the speed detection unit;
a calculation unit configured to calculate an index value of voltage change based on the waveform data in a predetermined speed range stored in the storage area; and
a determination unit configured to determine a progress condition of wear of the tread portion by comparing the index value calculated by the calculation unit with reference information corresponding to a predetermined speed range to determine a progress state of wear of the tread portion,
the predetermined speed range being a range of ±5 km/h from any speed within a range of 30 km/h to 60 km/h, and the reference information being an arbitrary rate of change with respect to the index value of voltage change when the tire was new, wherein
a sensor module comprising at least the element and the voltage detection unit is fixed to a tire inner surface via a container into which the sensor module is inserted, and
a width Lc1 of an opening portion of the container and a maximum width Lsm of the sensor module satisfy a relationship of 0.15≤Lc1/Lsm≤0.90.

* * * * *